Oct. 29, 1929. J. H. CRAWFORD ET AL Re. 17,471

BLASTING CARTRIDGE

Original Filed May 3, 1924

Witnesses:

Harry B. White.

Inventors.
John H. Crawford
Arthur W. Helmholtz
Dent Ferrell

By Allyn Harris Attorney

Reissued Oct. 29, 1929

Re. 17,471

UNITED STATES PATENT OFFICE

JOHN H. CRAWFORD, ARTHUR W. HELMHOLTZ, AND DENT FERRELL, OF HARRISBURG, ILLINOIS, ASSIGNORS TO SAFETY MINING COMPANY, A CORPORATION OF ILLINOIS

BLASTING CARTRIDGE

Original No. 1,632,887, dated June 21, 1927, Serial No. 710,724, filed May 3, 1924. Renewed December 19, 1925. Application for reissue filed June 17, 1929. Serial No. 371,600.

This invention relates to a new and improved means and method for blasting and more particularly to such means and methods comprising the use of a liquefied or solid gas and the utilization of its pressure when gasified by the application of heat.

In general, coal mining is now carried out with the use of common explosives set off by electrical fuses or detonators. These explosives have a number of drawbacks. Their explosive force is applied so rapidly that a large portion of the coal brought down is pulverized leaving a comparatively small percentage of lump coal. A further objection lies in the fact that dangerous gases are generated by the explosion. Also there is danger that the flame of the explosion will ignite mine gases, with serious results.

It has been heretofore proposed that liquid air or oxygen be used as a means for blasting, but they have been used in combination with combustible substances in the endeavor to cause rapid combustion. It has also been proposed to confine a liquid gas such as oxygen or air in a closed receptacle or container which is tamped into a bore hole in rock or coal seams. The liquid gas is expected to absorb heat from the surrounding walls sufficient for vaporization of the liquid gas, which is to generate enough pressure to burst the container and so act as an explosive cartridge.

The use of gases of this type is open to many serious objections. The critical temperature of liquid air is −140° centigrade and of liquid oxygen −118° centigrade. Consequently these gases are very expensive to liquefy and must be handled in vacuum bottles. The loss by evaporation is very great since their critical temperatures are so low that they are always vaporizing at usual atmospheric temperatures. To confine such gases in closed receptacles and handle them in normal mine temperatures would be extremely dangerous.

According to the present invention carbon dioxide is used in its liquid and solid state for purposes of explosion. Other gases having critical temperatures above normal mine temperatures may be used Carbon dioxide has a critical temperature of +31.1° centigrade or approximately 88° Fahrenheit which assures that it will remain in its liquid state at temperatures normally encountered in mines. This gas is therefore capable of being transported in closed containers while in the liquid or solid state without danger of rupture of the container. Consequently there are no evaporation losses such as are incident to the use of liquid air or oxygen.

The explosive force of liquid or solid carbon dioxide when gasified by the application of heat is substantially equal to a similar weight of black powder. The explosive force generated may be controlled within narrow and well defined limits by controlling the bursting strength of the container or rupturable portion of the container and by controlling the amount of heat applied. Such a control is possible by virtue of the fact that the nature of the expansion of the carbon dioxide is entirely different from ordinary explosives. Any of the permissible explosives rely essentially on their great heat of combustion, due to their exothermic action that takes place, to expand the gas formed by the reaction, whereas the entire expanding of the carbon dioxide as described in this application is due to the application of heat from some external source, the term "external source" meaning that other than by an exothermic reaction, and means one which can be accurately controlled as desired. With this feature clear in mind when considered with the feature of providing a wall rupturable at a definite predetermined pressure, it can be readily understood that the expanding of the gas can be accurately controlled at the time of release without relying entirely on the amount of expanding substance employed. The gas is non-combustible and hence when used there is no danger of ignition of coal dust or gas. The instant explosion of the gas on the release of pressure upon the container causes a cooling effect, thus dissipating the heat supplied and damping any combustion effect which might be given by the heated receptacle. The quantity of carbon dioxide liberated will be so small relative to the quantity of ventilating air passed through the mine as to have no effect on respiration. Since no flames or non-breathable gases result from the use of this explosive, it can be used with impunity while men are at work in an adjoining room or entry.

There is a decided difference between the explosion of common explosives and that of a cartridge produced according to the principles of our invention, which difference has a very important bearing on their utility in connection with use for mine blasting. It is found that ordinary explosives when set off expand with such rapid violence with forces imparted in all directions with the result that when these explosives are used in mine blasting, they cause a destructive effect on coal broken away from the wall of the mine and a consequent powdering of a large percentage of the coal yield. Inasmuch as this is an undesirable result as it renders so much of the coal mined second grade coal, it is desirable to provide a method of extracting coal by blast which will be free from this objection. Cartridges constructed according to our invention containing carbon dioxide gas are found to have the effect when exploded of breaking from the walls of the mine large quantities of coal in large lumps and free from the objectionable powder. This is attributable to the action of the substance which is not a liquid at ordinary temperature and pressure and which seeks a gaseous state under these conditions when liberated, as by means of a pressure responsive venting device. Ordinary explosives rely usually for their effect in the expanded condition of the gases due to the tremendous heat of combustion created during the explosion of the shell but which decrease in their forcing effect with a decrease in the temperature. Contrary to this action, substances which are gaseous at ordinary temperatures and pressures and which are forced to seek a gaseous state when in a confined area will not lose their forcing power as do ordinary explosives, for the reason that they do not rely upon high temperatures for their maximum effect. The action of carbon dioxide gas when liberated from a liquid state under pressure will be that of a comparatively slow and positive forcing or expanding action with the result that a large mass of coal is literally pushed outwardly from the wall of the mine without the detrimental crumbling or powdering of large portions incident to ordinary blasting operations. To this end, an improved cartridge has been formed which utilizes very efficiently this peculiar behavior of gases of this type, which embodies a cartridge container having a venting device which is responsive to the attainment of a predetermined pressure within the container for venting the latter to the atmosphere and liberating the expanded gas.

It is important in constructing this cartridge to provide for a special combination of elements and provide for the details of construction as these affect materially the behavior of the explosion when the cartridge is set off. Carbon dioxide is a very poor conductor of heat and it is on this account that it is necessary to embody several particular features of construction in this cartridge. One of these features is the selection of a closed container which will give vent to the expanding gases when a definite predetermined pressure has been reached. The pressure established within the cartridge is dependent upon the two factors, namely, the amount of gas compressed in the limited volume of the container, and to the heat to which this compressed gas is subjected. The predetermined pressure mentioned above is so selected relative to the quantity of carbon dioxide contained in the shell that it is necessary to effect a substantial heating of the entire volume of the gas instantaneously in order that the critical temperature of the liquefied gas will be reached. In view of the fact that the contained liquid is a poor conductor of heat, it is necessary to provide a heating device which will serve to heat instantaneously every particle of the liquid throughout the entire volume contained in the cartridge without relying on liquid to conduct heat to remote portions of its volume. If the heating action does not extend to the entire volume as described above, the quantity of liquid selected for a given cartridge as effecting an increase of pressure in the heating action will not be sufficient to overcome the resistance of the venting device of the container with the result that the cartridge is not exploded. The result of the combination of these various features produces a very efficient and desirable result for the reason that the greater expanding and forcing action is accomplished by the instantaneous increase in pressure with a consequent venting action when this pressure is reached. The most important feature for producing this result is the rapid dissemination of heat to every portion of the liquid volume in connection with the instantaneous venting of the container when this particular pressure is reached.

It is an object of the present invention to provide a new and improved means and method for blasting which are particularly adapted for the breaking down of coal.

Another object is to provide a means for blasting whereby a relatively slow expanding of the gaseous substance is effected without undue violence.

It is a further object to provide means and method of this character which generate no flame and no noxious gases.

It is an additional object to provide means and method which can be carried out by comparatively simple cartridges applied in the usual size of drill holes and capable of manufacture at small cost.

Other and further objects will appear as the description proceeds.

We have illustrated in the accompanying drawings certain preferred embodiments of our invention.

Figure 1:
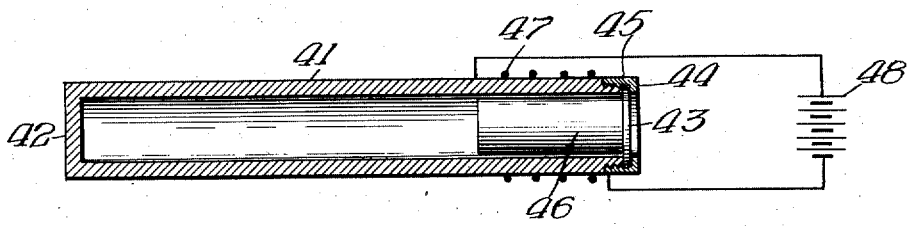
Figure 1 is a view of our device, shown in cross section.

Referring to the figures, with special reference to Figure 1, it will be noted that our invention embodies a casing 41 having a closed end 42. The venting device as herein disclosed is in the form of a rupturable closure disc 43 which is held in place over the open end of the casing by means of the overhanging flange 44 of the screw cap 45. It should be appreciated, however, that the pressure responsive venting device may assume a variety of forms differing from that herein shown and although the rupturable or shear disc is admirably suited to the purposes of the invention, the same is not necessarily limited to the use of such a device. Secured to the disk and extending inwardly therefrom is the container 46 adapted to contain any suitable explosive which is exploded by the application of heat. The resistance wire 47 surrounds only that portion of the casing which contains the explosive cartridge 46, which resistance wire is connected to the source of current supply 48.

Figure 2:
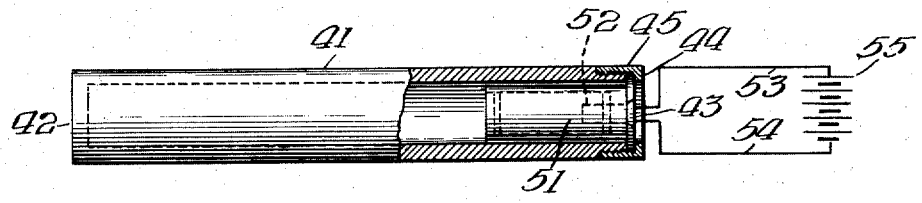
Figure 2 is a similar view except that it is partly in cross section and of a slightly modified form.

The form of construction shown in Figure 2 is similar to that shown in Figure 1. In this case, however, the explosive cartridge 51 is supplied with the electrical detonator 52 and this detonator is connected by wires 53 and 54 with the source of current supply 55.

In the use of both forms of cartridges shown, one end of the tube 41 is closed by metal disc 43 which ruptures at a predetermined pressure, which pressure, however, is considerably less than the strength of the body of the casing 11. When the disc 43 is broken away, this end of the container constitutes the only opening through which the gas can expand with the result that the entire expanding force is directed in the direction of the application of this end of the cartridge.

When the device shown in Figure 1 is set off, the entire casing 46 will be blown out with the central portion of the closure 43. A new casing is put in place with the new closure after filling the casing with liquid. The contents of the cartridge 46 may be any suitable explosive which is adapted to be exploded by the application of heat. This explosive may be applied at the mine shortly before the use of the cartridge. The heat is generated by passing electric current through the resistance wires 47 and this heat need only be sufficient to explode the explosive in the cartridge 46. The explosion of this explosive generates heat sufficient to gasify the liquid or solid in the receptacle which caused secondary explosive action, which ruptures the closure 43. It will be understood that the primary explosion of the material in the cartridge 46 will not be of sufficient force to rupture the closure 43. Practically the two explosions will usually be substantially simultaneous.

The form of casing shown in Figure 2 is similar to that shown in Figure 1. The operation of this form of construction differs merely in that the explosion in the cartridge 51 is set off by means of a small electrically operated detonator 52. This detonator operates instantaneously and the explosion of the material in the cartridge 51 generates heat sufficient to gasify the entire volume of the liquid or solid gas in the container instantaneously and cause the gasifying action which results in the desired explosive effect.

From the foregoing description, it should be readily appreciated that the essence of present invention is a blasting cartridge comprising a casing having means for venting the same to the atmosphere when a predetermined working or blasting pressure exists within the casing, but wherein both the casing and venting means are designed to withstand the pressure involved in the conversion of a gas to the liquid state and the introduction of the same into the casing, together with means for vaporizing the charge of liquefied gas thus formed within the casing and thereby raising the internal pressure sufficiently to operate the venting means and relieve the expanded gas.

All of the forms shown are simple in design and construction and may be cheaply manufactured. They may be used repeatedly and can be refilled for such use without expensive apparatus. These cartridges may be fitted in usual sizes of drill holes and consequently require no modification of other mine machinery.

With the use of our explosive method and means, a large number of falls of coal can be made per day as it will be unnecessary to fire shots only between shifts. In the use of our invention the loading machines now coming into use may be operated at maximum efficiency since by such large number of shots, large quantities of coal will be brought down in a single shift and it will be necessary to move the machines only back and forth two rooms in order to keep them busy.

It is to be understood that the forms shown are by way of illustration only as we contemplate such further modifications as may come within the spirit and scope of the appended claims.

We claim:

1. A blasting cartridge comprising a rigid casing, one end of the casing being adapted to be ruptured to release the contents in an inward direction only by a predetermined substantial working pressure in the casing, the remainder of the casing being of greater strength than said portion, a charge of carbon dioxide in the non-gaseous state in the casing and means for raising the temperature of the carbon dioxide to and above the critical temperature of the non-gaseous carbon dioxide.

2. A blasting cartridge comprising a cylindrical casing, one end of the casing being adapted to be ruptured by a predetermined substantial working pressure in the casing, a charge of carbon dioxide in the non-gaseous state in the casing and electrically controlled means for raising the carbon dioxide to and above its critical temperature whereby the carbon dioxide will become gasified and will rupture the end wall of the casing to release the contents in an inward direction only.

3. A blasting cartridge comprising a rigid casing, a portion of the casing being adapted to be ruptured to release the contents by a predetermined substantial working pressure in the casing, the remainder of the casing being of greater strength than said portion, a charge of carbon dioxide in the non-gaseous state in the casing and means for raising the temperature of the carbon dioxide to and above the critical temperature of the non-gaseous carbon dioxide.

4. A blasting cartridge comprising a casing adapted to receive a charge of highly compressed gas, said casing having means for venting the same to the atmosphere upon the attainment of a predetermined blasting pressure within the casing, said casing being constructed to withstand the said blasting pressure and said venting means being constructed to withstand the initial pressure of the charge of highly compressed gas and also an increase in pressure of the said charge up to the aforesaid predetermined blasting pressure, and a heater for the highly compressed gas charge to increase the pressure within the casing to and above the said predetermined blasting pressure for causing the said venting means to be operated and the charge liberated.

5. A blasting cartridge comprising a casing adapted to receive a charge of highly compressed gas, said casing having means for venting the same to the atmosphere upon the attainment of a predetermined blasting pressure within the casing, said casing being constructed to withstand the said blasting pressure and said venting means being constructed to withstand the initial pressure of the charge of highly compressed gas and also an increase in pressure of the said charge up to the aforesaid predetermined blasting pressure, and means for increasing the pressure within the casing to and above the said predetermined blasting pressure for causing the said venting means to be operated and the charge liberated.

6. A blasting cartridge comprising a rigid casing having a discharge opening therein, a closure member for said opening adapted to be ruptured to release the contents by a predetermined substantial working pressure in the casing, said closure member being larger than said opening and having sealing engagement with the surface of said casing bounding said opening, means adjustably associated with said casing and acting on said closure member for maintaining the sealed engagement between the same and said casing, the remainder of the casing being of greater strength than said closure member, a charge of compressed gas in said casing, and means for increasing the pressure of said charge to the aforesaid predetermined substantial working pressure to rupture said closure member and liberate the confined charge.

Signed at Chicago, Illinois, this 8th day of June, 1929.

JOHN H. CRAWFORD.
ARTHUR W. HELMHOLTZ.
DENT FERRELL.